Patented Aug. 30, 1932

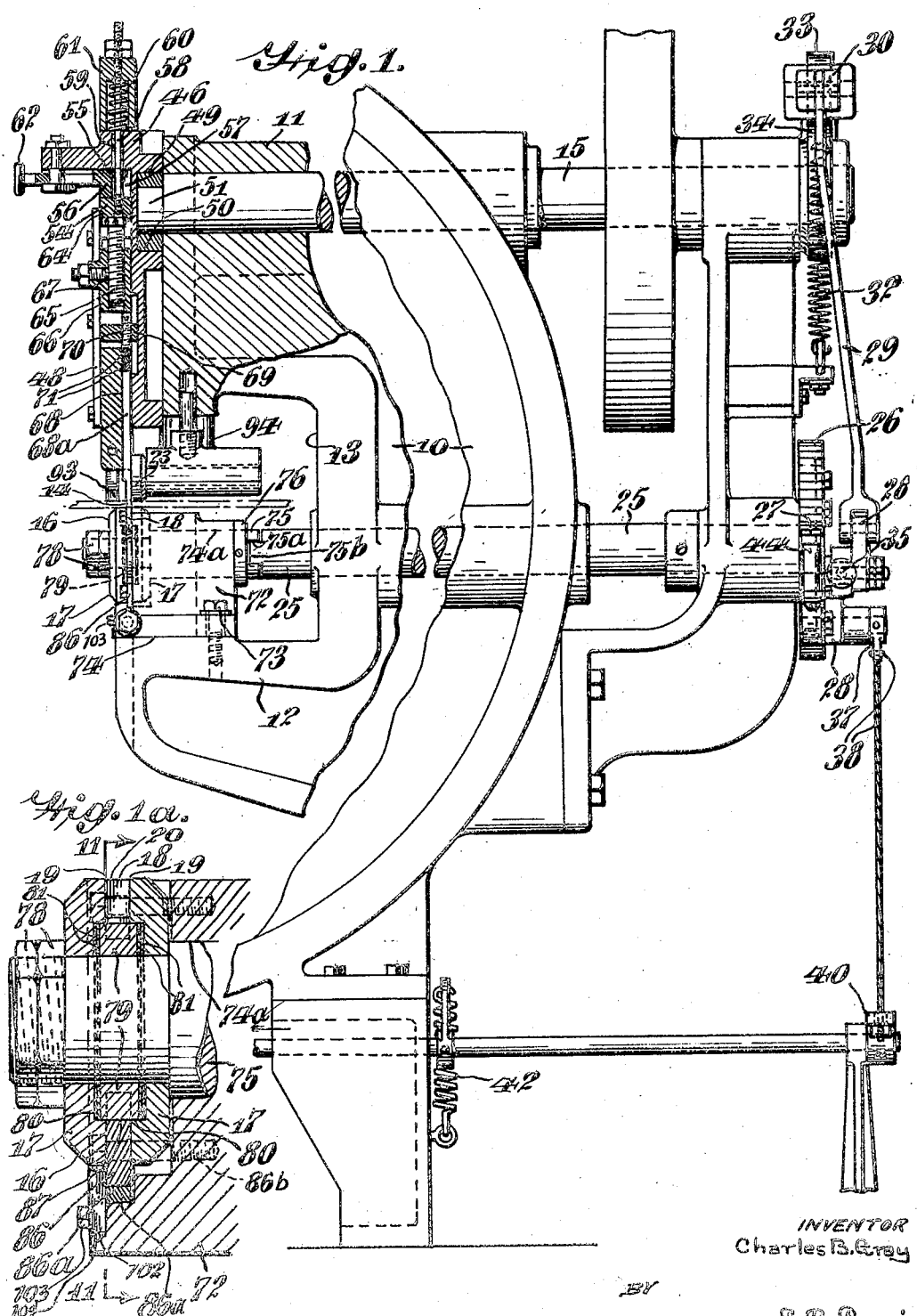

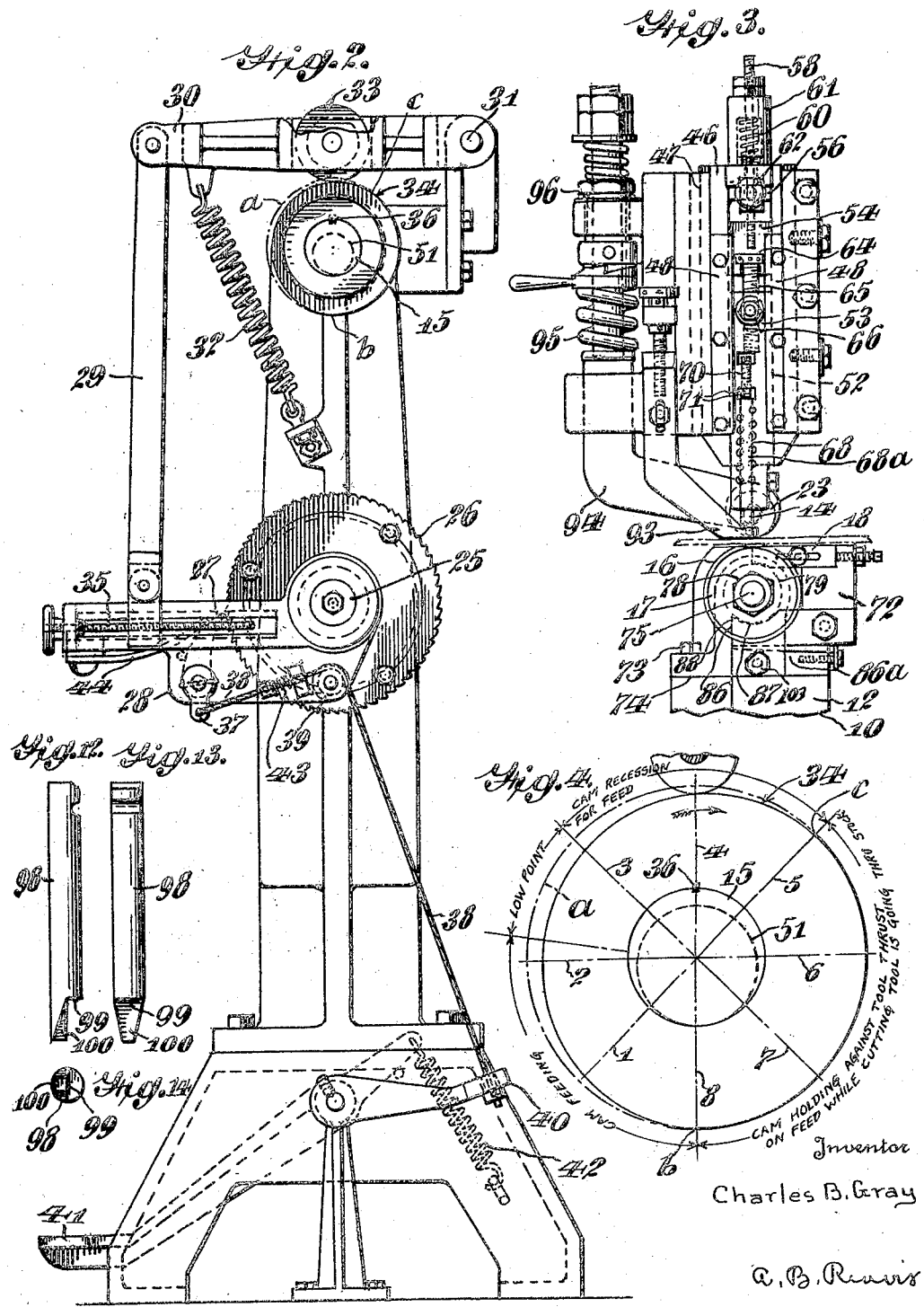

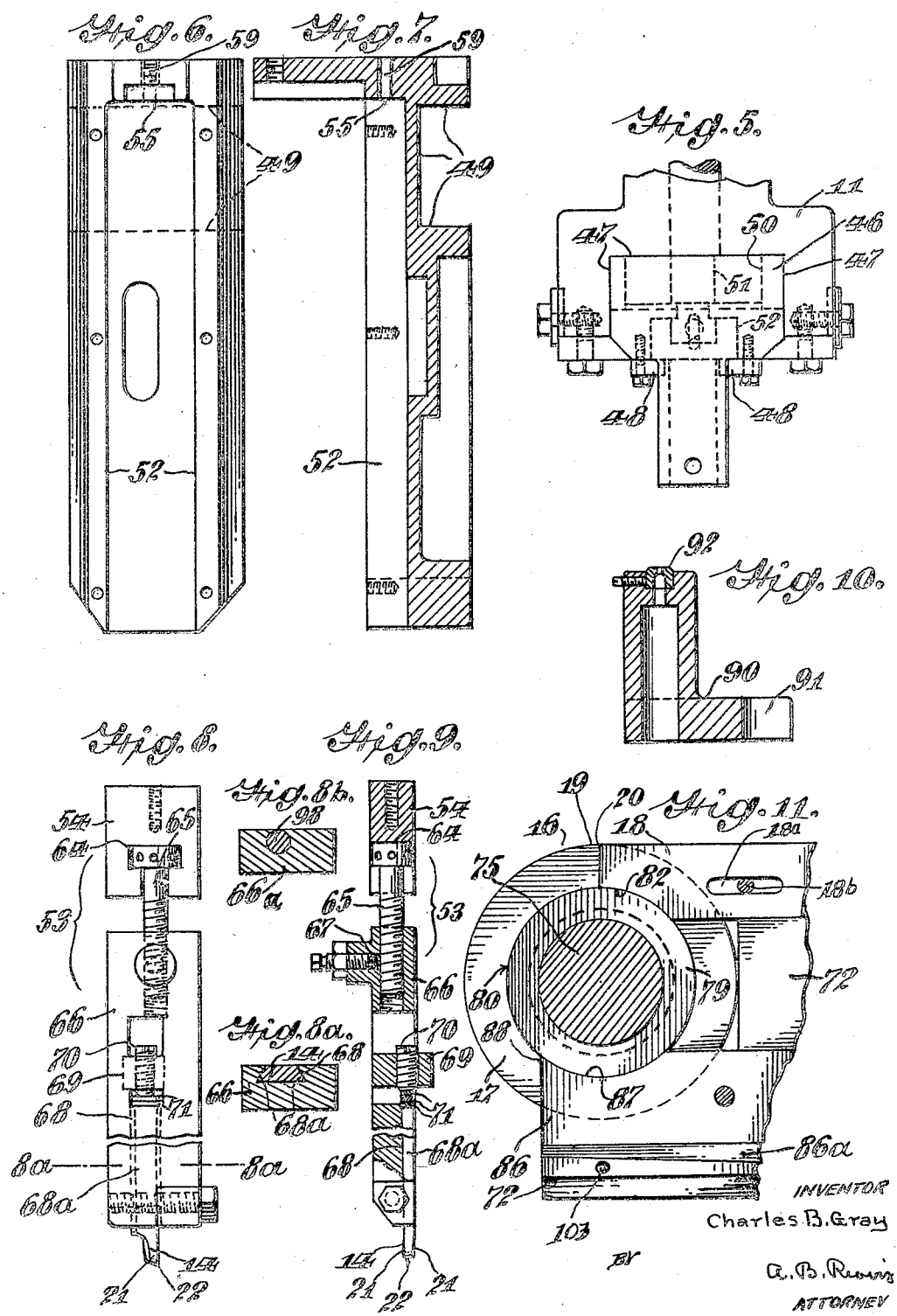

1,874,038

UNITED STATES PATENT OFFICE

CHARLES B. GRAY, OF MILLBOURNE, PENNSYLVANIA

CUTTING MACHINE

Application filed July 2, 1930. Serial No. 465,310.

My invention relates to cutting machines of the reciprocating cutter type.

In my Patent No. 1,098,377, of June 2, 1914, there is disclosed a cutting machine having a reciprocatory cutter cooperating with a rotary cutter or die construction. The reciprocatory cutter is a punch-like member or tool carried by a suitable reciprocatory holder or ram. The die construction consists of a pair of spaced die feed rollers and an interposed die member. A presser roller presses material against the die feed rollers, and, if the latter are moved, material is fed. The die feed rollers are actuated intermittently and alternately with cutting strokes of the reciprocatory cutter with the result that material is fed or advanced between cutting strokes. With a machine of this type, during the cutting stroke, the reciprocatory cutter or punch tends to force the material backwardly; and, unless the die feed rollers are held without looseness or backlash, the machine does not operate satisfactorily. This function has been performed by holding pawls and by brakes; however, with such holding devices, it is difficult to secure firm holding during the cutting stroke, particularly with materials of fairly heavy gage. An object of my present invention is to provide an improved holding device which will positively hold the die feed rollers during the cutting stroke, this being achieved by specially modified intermittent operating mechanism for the die feed rollers.

More particularly, I provide a cam which imparts intermittent movement to the die feed rollers, the cam having a portion of constant radius and a portion which decreases and then increases in radius, the cam surface of decreasing radius providing for backward movement of a pawl and that of increasing radius providing for forward movement. At the end of such forward movement, the effective radius of the cam has increased until the constant radius portion is reached, whereupon the mechanism is held while the cutting stroke takes place. During this dwell period, the mechanism is under the tension or pull existing during the forward or active portion of the intermittent movement with the result that there is no looseness or backlash during the cutting stroke even though there is looseness in the mechanism. A further object of my invention is to provide a cam in the intermittent mechanism for the die feed rollers which is constructed and arranged both to secure the intermittent operation as well as to hold such mechanism during the cutting stroke.

A further object of my invention is to provide improved and simple means for releasing the pawl of the intermittent mechanism for securing the step-by-step feed.

A further object is to provide a ram and tool holder for the reciprocatory tool together with a gag, which, when released, permits of the holder and the tool carried thereby being moved to ineffective position, whereby the necessity for a clutch is avoided and the construction of the machine becomes more economical.

A further object of my invention is to provide an improved tool holder having means for adjusting the tool.

A further object is to provide a die feed roller construction having improved means of support and wherein the roller elements may be redressed when the shearing edges become spalled or dulled.

A further object of my invention is to provide a cutting machine capable of receiving a die either of the feed roller type for straight cutting or of the round type for making curved cuts and templet cuts.

A further object of my invention is to provide an improved tool particularly useful in cutting tough metals, the tool having an arcuate front cutting edge and a back pilot tapered at opposite sides from the termini of the cutting edge downwardly.

These and other objects are effected by my invention as will be apparent from the following description and claims taken from the accompanying drawings in which:

Fig. 1 is a fragmentary side elevational view of my improved cutting machine;

Fig. 1a is a detail sectional view of the cutter feed roll construction;

Fig. 2 is an end elevational view of the machine shown in Fig. 1;

Fig. 3 is a fragmentary end elevation viewed from the end of the machine opposite to Fig. 2;

Fig. 4 is a diagrammatic view showing features of design of the actuating and holding cam of the cutter feed roll actuating mechanism;

Fig. 5 is a fragmentary plan view of the ram and guide;

Figs. 6 and 7 are detail views of the ram;

Fig. 8 is a detail view of the tool holding aggregate;

Fig. 8a is a sectional view taken along the line 8a—8a of Fig. 8;

Fig. 8b is a sectional view similar to Fig. 8a but showing a tool holding element for a round tool;

Fig. 9 is a further detail view of the apparatus shown in Fig. 8;

Fig. 10 is a sectional detail view of a round die holder and die which may be substituted for the die construction shown in the preceding views;

Fig. 11 is a sectional view taken along the line 11—11 of Fig. 1a; and

Figs. 12, 13 and 14 are detail views of a round tool.

Referring now to the drawings more in detail, I show a frame 10 having upper and lower arms 11 and 12, respectively, defining a throat space 13. The upper arm is provided with a reciprocating cutting tool 14 operated from the power shaft 15 and the tool cooperates with die mechanism, at 16.

The die mechanism, at 16, is preferably of the cutter roll feed type, that is, the die is comprised by a pair of spaced roller elements 17, 17 and an intervening bar like die member 18, the rollers and the intervening member having cutting edges 19 and 20, respectively, which cooperate with the cutting edges 21 and 22, respectively, of the tool 14.

With the present type of machine, material is advanced by the die cutter feed rolls 17, 17 and the upper presser roller 23, feeding taking place between cutting strokes of the tool 14 and the extent of feeding being such that chips or slugs are successively removed in order that a sheet may be cut or slotted.

The die feed rolls 17, 17 are operated in a step-by-step manner by the countershaft 25 to which is connected the ratchet wheel 26 actuated by the pawl 27 carried by the oscillatory arm 28 connected by a link 29 to the lever 30 pivoted at 31 and having a spring 32 which keeps the lever follower 33, for example, a roller, in engagement with the cam 34 keyed to the power shaft 15. The extent of feed may be varied by adjusting the lower end of the link 29 in or out along the arm 28 by the screw 35.

Heretofore, the countershaft has been operated by an intermittent grip device and holding pawls or brakes have been used to hold the die feed rolls from backward movement due to the cutting action. The shearing action of the tool 14 results in a component of force tending to move the sheet being cut in a backward direction and this force is transmitted to the die feed rolls 17, 17. If the latter rolls are not restrained against movement, they will move. The holding mechanism should not have looseness or backlash, and holding pawls and brakes have not been entirely satisfactory, particularly with heavier gage material, for this reason. In accordance with the present invention, the countershaft 25 and the rolls 17, 17 are held rigidly or firmly without backlash or looseness, not by auxiliary devices such as holding pawls or brakes, but by the special character of transmission mechanism between the power shaft 15 and the countershaft 25, the cam 34 having such a design that it actuates the mechanism intermittently and holds such mechanism against movement during cutting strokes, or at least during first portions thereof.

Referring now to the cam 34 more in detail, it preferably consists of a disk keyed to the power shaft 15, a key being shown at 36. As shown by the dotted line —a— the cam is relieved from —b— to —c—, the remainder of the cam being of constant radius. The cam first decreases in radius and then increases from —b— to —c—, the decrease giving a backstroke to the pawl 27 and the increase giving an actuating stroke to the pawl. At —c—, or at the end of the actuating stroke of the pawl 27 engaging the ratchet wheel 26, the pawl is under the actuating pull or tension and it is so held until it reaches —b—. While the pawl is so held by the portion of the cam of constant radius, such pawl holds the ratchet wheel 26 and the rolls 17, 17 against retrograde movement and the cutting stroke takes place during this period. With this arrangement the die feed rolls 17, 17 are firmly held even though the transmission mechanism may have looseness therein.

Feeding may be discontinued at any time by the operator removing his foot from the treadle. To this end the pawl has a tail 37 connected to a cable 38 passing over a sheave 39 and having its lower end connected to the arm 40 of the treadle 41. As soon as the operator removes his foot from the treadle, the spring 42 moves the treadle and pulls the cable 38 to release the pawl, the cable including the spring 43 permitting of movement of the treadle in case the pawl cannot be instantaneously released, as would be the case when the pawl is under the load of feeding. When the load on the pawl is relieved, the spring 43 overcomes the pawl spring 44 to release the pawl. Feeding is again started by the operator overcoming the spring 42, whereupon the pawl spring 44 moves the pawl back to the position where it may engage the ratchet wheel.

With this machine a clutch is unnecessary, a gag being used to move the tool 14 to ineffective position. In the drawings, I show a ram 46 having a guideway 47 and ram retaining strips 48 secured to the guideway. The ram is provided with a cross slot 49 at the back for the block or shoe 50 having an opening fitting the eccentric 51 on the power shaft 15. With rotation of the power shaft the ram is reciprocated.

The ram 46 has a guideway 52 for the cutting tool aggregate 53, the latter including the upper block 54 between which and the abutment 55 on the ram 46 fits the gag 56, the latter preferably being bifurcated at 57. A rod 58 is connected to the block 54, passes up between the furcations 57, and then passes through the opening 59 provided in the top portion of the ram. A spring 60 is arranged between the upper end of the ram and the outer end of the rod 58, a thimble 61 being disposed over the spring and serving as manual means for depressing the rod 58 against the compression of the spring. In operation, the thimble 61 engages the ram to produce a unitary structure assuring stripping of tool from stock. When the gag is in position, the spring 60 is under compression, and when the gag 56 is pulled out by pulling on the button 62, the spring raises the tool relatively to the ram to ineffective position.

The tool holder aggregate is made up of the block 54, already referred to, having a T-shaped opening 64 for the head of the screw 65 connected to the lower block 66, a soft metal locking member 67 being shown to lock the threaded connection. For a purpose to be described, the lower block or tool holder has a dovetail groove 68 to receive the dovetail shank 68a of the tool 14. By turning the screw 65 the tool 14 may be adjusted up or down. To secure further adjustment of the tool, I provide a lug 69 on the block or holder 66 having a screw 70 engaging either the top of the tool 14 or an intervening filler block 71 of suitable length or thickness.

The die feed rolls 17, 17 are carried by means permiting of ready detachment and dismantling. To this end, the roll supporting head or block 72 is connected by hold-down screws 73 to the die bed portion 74 of the frame 10. The head or block 72 has a bearing 74a for the spindle 75 having a collar 76 fitting against one end of the bearing. At the end of the spindle remote from the collar there is a reduced portion which receives the rolls 17, 17, and nuts 78 hold the rolls 17, 17 and the intervening collar or ring 79 in place with the innermost roll 17 bearing against the other end of the bearing 74. The end of the spindle adjacent to the collar has a readily detachable coupling connection with respect to the countershaft 25. For example, I show the spindle provided with a diametral slot 75a receiving a tongue 75b on the countershaft. With this construction, the rolls 17, 17 and the intervening ring may be readily removed from the spindle upon removal of the nuts 78, and the entire roll die head may be removed upon removal of the hold-down bolts or screws 73, the coupling portions 75a and 75b permitting of ready disconnection of the spindle from the counter shaft 25.

The rolls 17, 17 and the bar 18 are of special construction permitting of redressing or grinding down when the cutting edges become dulled or spalled. Adjacent sides of the rolls are recessed or counterbored at 80 so as to overhang the ring or collar 79, shims 81 preferably being arranged between the ring or collar 79 and the bottoms of the recesses or counterbores 80. Not only may the adjacent faces of the rolls be ground, suitable adjustment being made by shims, but the collar may be made long enough to resist being battered down by the arcuate bearing portion 82 of the die bar 18. The bar 18 has a slot 18a for the screw 18b, the latter connecting the bar to the head 72, whereby the bar may be removed, replaced and adjusted.

Owing to the die feed roll assembly being carried by the shaft section 75 in an overhanging manner to facilitate assembly and dismantling of the roll elements, it is desirable to provide additional support for the roll assembly to oppose deflection of the shaft section due to cutting stresses. To this end, I provide a pillow block and slug ejector 86 cooperating with the ring 79 and a pillow member 102 cooperating with the periphery of the outer roll element 17. Working stresses are transmitted from the rolls 17, 17 and the bar 18 to the ring 79 and from the latter to the pillow member 86 as well as from the outer roll element 17 directly to the pillow member 102. While I show these two means for affording support for the die roll assembly, it is to be understood that either alone may be sufficient; however, when the outer pillow member 102 is relied upon entirely for this purpose, the member 86 is preferably retained for ejection purposes. While the pillow and ejector member 86 serves to transmit stress directly from the ring 79 to the support, it will be apparent that, as the roll elements 17, 17 and the spacing ring 79 fit the shaft section 75 closely, deflection of the latter will also be resisted by the outer pillow member 102 and to assure this the ring 79 has a telescopic or spigot fit with respect to the rolls 17, 17.

The pillow and ejector member 86 is preferably provided with an upper arcuate bearing surface 87 for cooperation with the spacing ring 79, and one end 88 of the member 86 constitutes a slug or chip ejector. The member or block 86 is held in place by a screw 86b and a wedge 86a is arranged beneath the block so that the arcuate bearing surface may be adjusted relatively to the ring 79.

The pillow member 102 has its upper side curved to fit underneath the outermost roll 17 and it is connected to the head by a screw 103 and it is supported underneath by a ledge construction 104.

The present machine is capable of being operated either as a roller die shear or as a round tool shear. The roll die is advantageous in making straight or large or small radius curved cuts, and the round tool is useful in following a templet in that cuts of very small radii may be cut. The roll die head or block 72 may be removed from the die bed portion of the frame by removal of the hold-down screws 73 and replaced by a block 90 having openings 91 suitable for the hold-down screws and provided with a round die 92. With removal of the die rolls 17, 17, the presser feed roller 23 cannot act as a feeding element; however, it may be raised and cooperate with the stripper 93 to strip the round tool. As the presser feed roller 23 is arranged on the opposite side of the tool 14 from the stripper, it is in advantageous position to cooperate in the stripping function in connection with a round tool. As the lower block of holder 65 has a dovetail groove 68 to receive the dovetail shank 68a of the tool, the tool and the presser roll 23 may be located quite close to each other without interfering with freedom of movement of the tool.

Where a round tool is used, I prefer to use a tool 98 having an arcuate front cutting edge 99 and a depending pilot portion 100, the latter being tapered downwardly at opposite sides from termini of the cutting edge 99. As shown the cutting face bounded by the edge 99 is substantially semi-circular and the pilot portion, except for the tapering, is substantially semi-circular in cross section. This form of tool is particularly advantageous in cutting tough metals—there is plenty of room in front of the pilot for displacement of metal being sheared and the tapering provides room for corner flow and more ready release from slugs.

When a round tool, such as shown in Figs. 12, 13 and 14, is used, the block or tool holding element 66 in Figs. 8 and 8a is replaced by a block or tool holder 66a having a cross section such as shown in Fig. 8b.

The upper arm of the frame is provided with a head 105 having the aforesaid ram guide. Lugs 106 and 107 project laterally from the head and have openings through which extends the stem 108 of the presser roll carrying member 94. A sleeve 109 is disposed about the stem 108 and it is threaded to the upper lug 106, the upper end of the sleeve abutting the lower end of the spring 110 and the lower end abutting the cam ring 11 keyed to the stem 108 and provided with cam elements or faces 111a cooperating with the cam elements or faces 112 on the turnable member 113 having a handle 114. The turnable member 113 abuts the upper end of the spring 115 and the lower end of the latter abuts a shoulder 116 on the stem 108. A nut 117 carried by the upper end of the stem 108 abuts the top end of the spring 110.

The upper spring 110 serves to pull up the presser roll assembly to the extent permitted by the stronger spring 115 when the turnable member 113 is turned to bring the cam elements to releasing position, as shown in Fig. 3. When the cam elements are in releasing position, there is no compression in the spring 115 due thereto, the only compression being that due to movement of the stem 108 by the upper spring. Camming down of the upper end of the spring 115, overcomes the upper spring 110 and causes the presser roll assembly to move down, the roll engaging the stock under pressure dependent upon the strength of the spring 115 and the extent of compression brought about by camming down. Hence the presser roll engages the stock under desired pressure, it may yield due to irregularities in the stock, and maximum pressure is exerted at the right time, that is, incident to engaging the roll with the stock.

The presser roll assembly may be raised and lowered by adjusting the threaded sleeve 109 in the upper lug 106. Sufficient tension is placed in the upper spring 110 to secure the desired raising effect by adjustment of the nut 117, the latter having associated therewith a jam nut 117a to hold it in place. Hence the presser roll assembly may be adjusted vertically for different stock thicknesses, the presser roll may be raised by the upper spring 110 when permitted by the cam elements, and the lower and stronger spring 115 is effective, when compressed by the cam elements, to provide for yielding support for the presser roll.

The head 105 is also provided with a screw 120 arranged in the guide slot 121 of the stripper 93, the upper end of the stripper having a threaded connection with the adjusting screw 122 carried by the lug 123 on the head and having a turning head 124. The screw 122 is turned to raise or lower the stripper.

It will be seen that the frame head 105 is relatively simple in design considering that it carries the ram, the presser roll, and the stripper, the presser roll and the stripper being carried by lugs on the head, whereby the head may be readily cast and very little machining be required for the operating parts. In addition, the arrangement of parts is compact and the parts are accessible.

While I have shown my invention in two forms, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

What I claim is:

1. The combination of a cutting machine having cooperating rotary and reciprocatory cutters, of mechanism for rotating the rotary cutter intermittently and alternately with cutting strokes of the reciprocatory cutter including a cam having an actuating portion and a holding portion and means for reciprocating the reciprocatory cutter so that cutting strokes thereof take place while the rotary cutter is held against movement in a reverse direction by the holding portion of the cam.

2. The combination of a cutting machine having cooperating rotary and reciprocatory cutters, of a power shaft having an eccentric for imparting reciprocatory movement to the reciprocatory cutter, mechanism for rotating the rotary cutter intermittently including a cam having an actuating portion and a holding portion, and means for connecting the cam to the power shaft so that it is timed to hold the rotary cutter against movement in a reverse direction during cutting strokes of the reciprocatory cutter.

3. The combination with a cutting machine having cooperating rotary and reciprocatory cutters, of a power shaft having an eccentric for imparting reciprocatory movement to the reciprocatory cutter, mechanism for rotating the rotary cutter intermittently including a cam having a peripheral holding portion of constant radius and an actuating portion whose radius first decreases from the constant radius and then increases to the constant radius, and means for connecting the cam to the power shaft so that it is timed to hold the rotary cutter against movement in a reverse direction during cutting strokes of the reciprocatory cutter.

4. The combination with a cutting machine having cooperating rotary and reciprocatory cutters, of a power shaft having an eccentric for imparting reciprocatory movement to the reciprocatory cutter, a countershaft connected to the rotary cutter, a ratchet wheel connected to the countershaft, an actuating and holding pawl cooperating with the ratchet wheel, means for moving the pawl in an oscillatory manner with respect to the axis of the ratchet wheel and embodying a cam having a holding portion and an actuating portion, and means for connecting the cam to the power shaft so that it is timed to hold the rotary cutter against movement in a reverse direction during cutting strokes of the reciprocatory cutter.

5. The combination with a cutting machine having cooperating rotary and reciprocatory cutters; of a power shaft having an eccentric for imparting reciprocatory movement to the reciprocatory cutter; a countershaft connected to the rotary cutter; a ratchet wheel connected to the countershaft; an actuating and holding pawl cooperating with the ratchet wheel; and means for moving the pawl in an oscillatory manner including a cam having a peripheral holding portion of constant radius and a peripheral actuating portion which first decreases from the constant radius and then increases to that radius, a follower engaging the cam, a lever pivoted with respect to the ratchet wheel axis, a link connecting the follower to the lever, means for biasing the follower into engagement with the cam, and means for connecting the cam to the power shaft so that it is timed to hold the rotary cutter against movement in a reverse direction during cutting strokes of the reciprocatory cutter.

6. The combination as claimed in claim 5 with means for varying the radius of the connection of the link with the lever.

7. The combination with a cutting machine having a reciprocatory cutter, rotary die feed rolls, and a presser roll cooperating with the die feed rolls to grip and secure feeding of a blank; of a power shaft having an eccentric for reciprocating the reciprocatory cutter; a countershaft connected to the die feed rolls; and mechanism for imparting intermittent rotary motion to the countershaft including a cam having holding and actuating portions and means for connecting the cam to the power shaft in such timed relation with respect to the eccentric that the rotary die rolls are held against movement in a reverse direction during cutting strokes of the reciprocatory cutter.

8. The combination with a cutting machine having a reciprocatory cutter, rotary die feed rolls, and a presser roll cooperating with the die feed rolls to grip a blank and secure feeding of the latter; of a power shaft having an eccentric for reciprocating the reciprocatory cutter; a countershaft connected to the die feed rolls; and mechanism for imparting intermittent rotary motion to the countershaft including a cam having holding and actuating portions, a follower cooperating with the cam, a ratchet wheel connected to the countershaft, a lever pivoted with respect to the ratchet wheel axis, a pawl pivoted to the lever and cooperating with the ratchet wheel, means for biasing the pawl to engage the ratchet wheel, a link connecting the follower and the lever, and means for connecting the cam to the power shaft in such timed relation with respect to the eccentric that the rotary die rolls are held against movement in a reverse direction during cutting strokes of the reciprocatory cutter; and means for moving the pawl to ineffective position including a cable connected to the pawl, a treadle connected to the cable, and means for biasing the treadle in such a direction as to move the pawl to ineffective position.

9. The combination as claimed in claim 8 wherein a spring is incorporated in the effective length of the cable.

10. In a cutting machine, a reciprocating cutter, a cooperating rotary cutter including a pair of spaced and counterbored annular cutter members, a ring fitting the counterbores, a fixed cutter having its cutting end resting on the ring, and a spindle for supporting the annular cutter members and the intervening ring.

11. The combination as claimed in claim 10 with shims cooperating with the ring to space the cutting edges of the cutter members a predetermined distance apart.

12. The combination as claimed in claim 10 with a pillow member extending between the cutter members and having a supporting surface arranged underneath the ring.

13. In a cutting machine, a reciprocatory cutter, a die construction comprising a pair of spaced cutter feed rolls and an intervening cutter bar, said cutter feed rolls having opposed counterbores, a ring extending between the cutter feed rolls and into the counterbores, a spindle supporting the cutter feed rolls and the ring, said cutter bar having its cutting end sustained by the upper portion of the ring, and a pillow member extending between the cutter feed rolls and cooperating with the ring for sustaining working stresses imposed on the cutter feed rolls and having a deflector portion for ejecting slugs or chips from between said rolls.

14. In a cutting machine, a reciprocatory ram, a tool holder carried by and movable relatively to the ram in the direction of reciprocation, an abutment on the ram, a gag between the abutment and the tool holder and carried by the ram, and means carried by the ram for moving the tool holder toward the abutment when the gag is withdrawn from between the abutment and the tool holder.

15. The combination as claimed in claim 14 with means carried by the ram and capable of manual operation for separating the tool holder from the abutment to provide for entry therebetween of the gag.

16. In a cutting machine, a reciprocatory cutter; a bearing; a spindle carried by the bearing and overhanging one end of the latter; a die construction cooperating with the cutter and including a pair of cutter roll elements, a spacing ring element between the roll elements, and a die bar having its cutting end resting on top of the spacing ring element; said cutter roll and the spacing ring element being carried by and fitted to the overhanging portion of the spindle; means for reciprocating the cutter and for turning the cutter roll and spacing ring elements; and a pillow member disposed below one of said elements to limit deflection of the overhanging portion of the spindle due to cutting stresses.

17. In a cutting machine, a frame, a reciprocatory cutter carried by the frame, a detachable head carried by the frame and having bearing means, a spindle carried by the bearing means and having a clutch portion at one end, a die construction cooperating with the reciprocatory cutter and including a pair of spaced die cutter rolls carried by the spindle, and power means for reciprocating the reciprocatory cutter and for turning the die cutter rolls and including a clutch portion for connection with the spindle clutch portion.

18. In a cutting machine, cooperating punch and die members, a frame carrying the die member and provided with a head having a guideway, a ram fitting the guideway and carrying the punch, lateral lug means carried by the head, a stem carried by the lug means, a presser roll carried by the lower end of the stem and disposed adjacent to the punch, and means for raising and lowering the presser roll including spring means effective to yieldingly urge the stem and presser roll downward.

19. In a cutting machine, cooperating die and punch members, a frame carrying the die member and provided with a head having a vertical guideway disposed above the die member, a ram fitting the guideway and carrying the punch member, a stripper arranged adjacent to the punch, guide means for the stripper carried by the head, and a screw carried by the head for raising and lowering the stripper.

20. In a cutting machine, cooperating die and punch members, a presser roll arranged adjacent to the punch member, a spring associated with the presser roll to engage the latter with stock under pressure, means for compressing said spring to cause the presser roll to engage stock under pressure, and a spring for raising the presser roll when said compressing means is released.

21. A round tool for a cutting machine having a front cutting face bounded by an approximately semi-circular cutting edge whose termini are at a back pilot which depends from the cutting face, the pilot having its front face spaced approximately the tool radius from the center of the cutting edge and having its sides tapered downwardly from the cutting face so that guide edges adjacent to the latter are spaced apart nearly a tool diameter.

22. In a cutting machine, a reciprocatory cutter, a supporting head having a bearing, a spindle having a journal portion fitting the bearing and an overhanging tool-holding portion extending beyond one end of the bearing, an overhung die feed roll cutter construction cooperating with said reciprocatory cutter and carried by said tool-holding portion, and a pillow member carried by the head and cooperating with said roll cutter construction to resist working stresses imposed on the latter.

In testimony whereof, I have hereunto subscribed my name this 30th day of June, 1930.

CHARLES B. GRAY.